United States Patent

[11] 3,565,453

[72] Inventor Americo Del Raso
21858 River Oaks Drive, Rocky River, Ohio 44116
[21] Appl. No. 825,778
[22] Filed May 19, 1969
[45] Patented Feb. 23, 1971

[54] WHEELBARROW
1 Claim, 5 Drawing Figs.

[52] U.S. Cl. .................................................. 280/38, 280/47.31
[51] Int. Cl. .................................................. B62b 1/20
[50] Field of Search .......................................... 280/47.3, 47.31, 36, 38, 39

[56] References Cited
UNITED STATES PATENTS
2,484,677  10/1949  Binz .............................. 280/38
2,800,335   7/1957  Clapp ........................... 280/47.31X Primary Examiner—Leo Friaglia
Assistant Examiner—Leslie J. Paperner
Attorney—Sanford Schnurmacher ABSTRACT: A wheelbarrow having its wheel, legs and handles foldable against the underside thereof, for compact storage.

PATENTED FEB 23 1971

INVENTOR.
AMERICO DEL RASO
BY Sanford Schnurmacher
ATTORNEY.

WHEELBARROW

The primary object of the invention is to provide a wheelbarrow having the usual forward supporting wheel, vertically dependent rear legs and longitudinally extending operational handles, that can be easily and quickly converted to a compact unit, occupying a minimal space for storage, by folding its wheel, legs and handles against the underside of the barrow body.

This and other objects of the invention will become apparent from a reading of the following specification and claim, together with the accompanying drawing, wherein:

Figure 1:
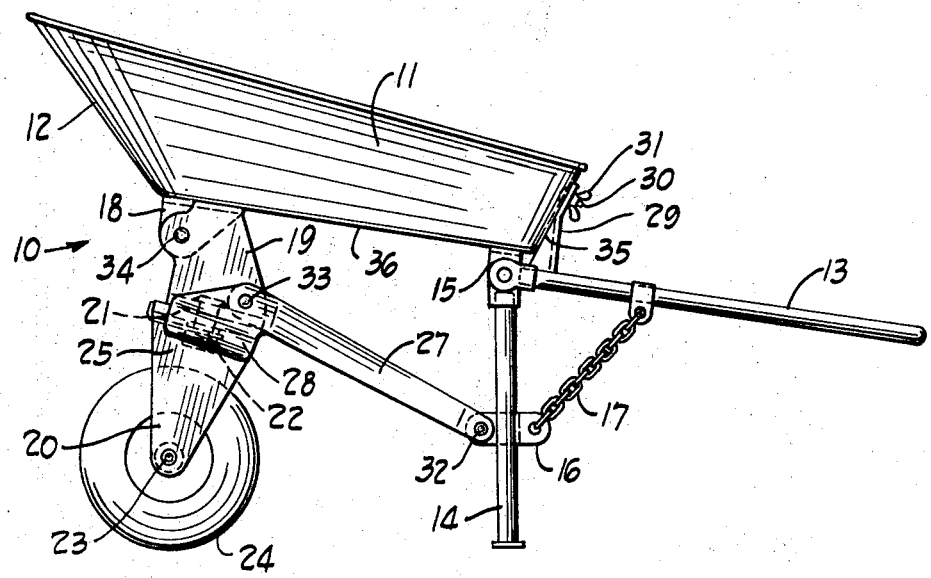
FIG. 1 is a side elevational view of the wheelbarrow, that is the subject of the invention, showing it in its operational condition.

Referring more particularly to the drawing, there is seen in FIG. 1 the wheelbarrow that is the subject of the invention, broadly indicated by reference numeral 10, as it appears in its operational, fully erected, condition.

The load carrying barrow body 11 has a flat bottom 36 and flat upwardly inclined rear and front walls 35 and 12, respectively.

When at rest the forward end of the body 11 is supported by a wheel 24 and its rear end is supported by two legs 14.

When the wheelbarrow is being used to transport its contents from place to place it is lifted and pushed forward by the horizontal, rearwardly extending, handles 13.

Figure 3:
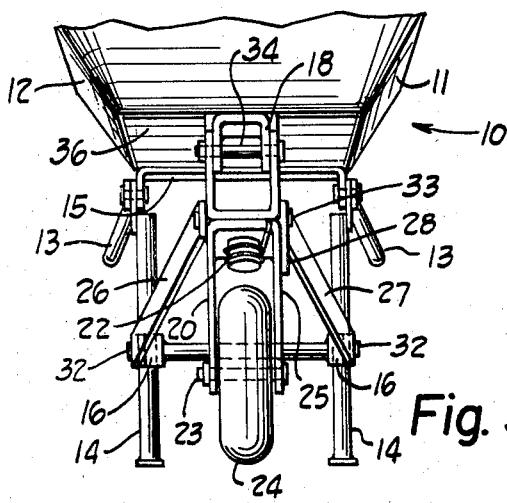
FIG. 3 is a left end view of the wheelbarrow, illustrated in FIG. 1.

A base bracket 18 is mounted at the forward end of the underside of the bottom wall 36, on the longitudinal center line thereof, as seen most clearly in FIG. 3.

Reference numeral 19 indicates a table, tiltably mounted on the bracket 18, through a pivot pin 34, for fore and aft movement relative to the barrow body centerline.

A U-shaped fork 20 is swivelly mounted on the table 19 through a shaft 21. The fork 20 has a flat camming surface 25 on one leg, and a wheel 24 journaled therein on axle 23, as again seen in FIG. 3.

Figure 4:
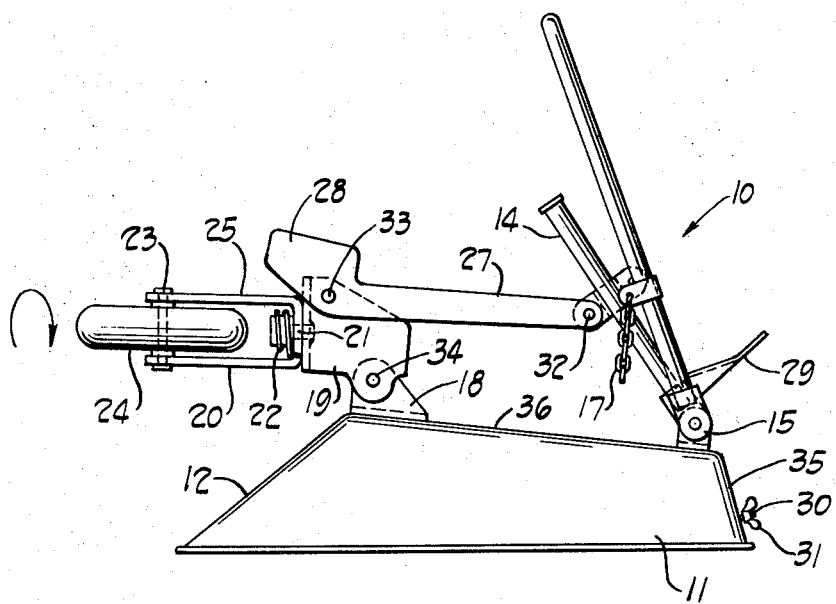
FIG. 4 is a side elevational view of the wheelbarrow, showing it resting on its body top, with its wheel, legs and handles in a semifolded condition; and, FIG. 5 is a side elevational view showing the wheelbarrow illustrated in FIG. 4 in its fully collapsed and folded condition, ready for storage.

A spring 22 acts to bias the fork 20 to a position wherein the wheel 24 is normally held in a first position, shown in FIG. 4, wherein the wheel is positioned crosswise of the barrow body longitudinal centerline.

A pair of spaced legs 14 are hingedly mounted on a bracket 15 located at the rear end of the barrow body bottom wall 36.

A pair of handles 13 are also hingedly mounted on the bracket 15, independent of the legs 14. Each leg 14 has an anchor plate 16 positioned intermediate of its ends.

The two legs 14 are connected to the tiltable table 19 through two rigid tie rods 26 and 27. The two tie rods are connected to the table 19 through an elongated pivot pin 33, and to the legs 14 through pivot pins 32 in the anchor plates 16, as seen most clearly in FIG. 2.

Each leg anchor plate 16 is also connected to the handles 13 through a flexible tension means 17, shown in the form of a link chain. It is to be understood that other suitable flexible tension means could be used, such as a wire cable, or the like.

The tie rod, identified by reference numeral 27, has a flat cam 28 at the forward end thereof, adjacent the table 19, which is engageable with the fork camming surface 25 under conditions, and for a purpose, to be described hereinafter.

Figure 5:
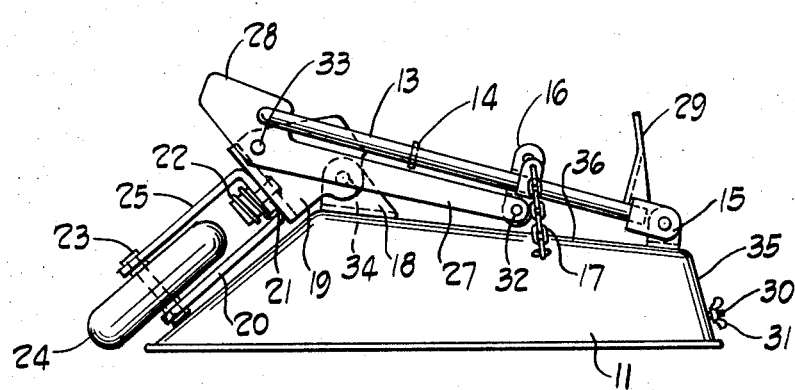

Referring to FIG. 5, the wheelbarrow 10 is shown in its fully collapsed condition with the legs 14 and handles 13 folded down against the underside 36 of the body 11, and the wheel 24 resting against the forward wall 12 thereof, positioned crosswise of the body longitudinal centerline.

Figure 2:
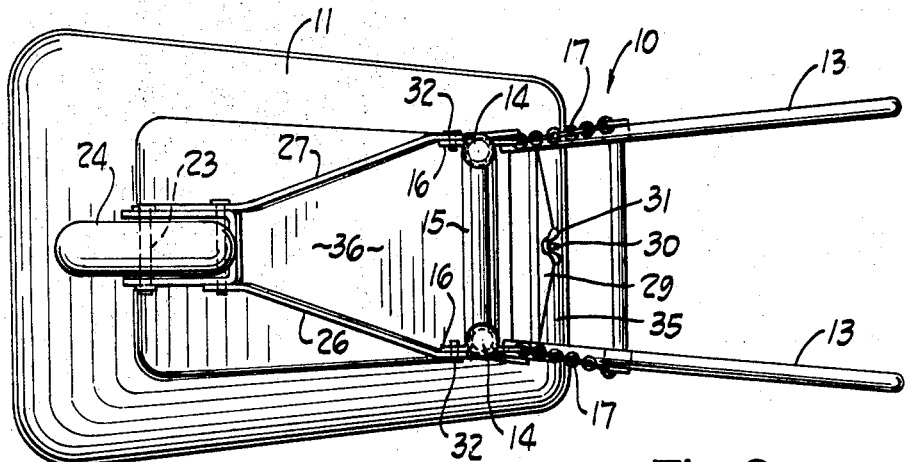
FIG. 2 is a bottom plan view of the same.

To put the collapsed wheelbarrow in the load-bearing, erected, condition, illustrated in FIGS. 1, 2 and 3, the following procedure is followed:

The handles 13 are swung to a substantially horizontal position, extending outwardly of the rear wall 35.

This movement causes the chain 17 to swing the legs 14 to a vertical position. At the same time, the erection of the legs causes the tie rods 26 and 27 to tilt the table rearwardly.

This movement acts to move the tie rod cam 28 into contact with, and across, the face of the fork camming surface 25.

As a result the fork 20 is made to swivel into a second position, wherein the wheel 24, supported in the fork, is pivoted to a position in which it is aligned with the longitudinal centerline of the barrow body 11, as is seen most clearly in FIG. 3.

The handles 13 are locked in their erected position by means of a slotted plate 29, mounted between the handles, which is nested against a bolt 30 mounted on the rear wall 35 of the barrow body 11, and is held thereat by means of thumb nut 31.

It will be apparent from FIG. 1 that the chain 17 acts to keep the several coacting parts under tension, to maintain them in their erected position.

Furthermore, when the handles are lifted in transporting a load, the upward pull will act to increase the tension, thereby assuring that the wheel and legs will be maintained in their erected position.

It is evident that by reversing the procedure just described the wheelbarrow 10 can be returned, easily and quickly, to the compact, collapsed, condition illustrated in FIG. 5.

It will now be apparent that there has been provided a device which accomplishes the objective heretofore set forth.

I claim:

1. A wheelbarrow having its wheel, legs and handles foldable against the underside thereof, for compact storage, comprising in combination:
   a. a barrow body having a flat bottom and upwardly inclined forward and rear walls;
   b. a base bracket mounted at the forward end of the underside of the body, at the longitudinal centerline thereof;
   c. a table tiltably mounted on the base bracket, for fore and aft movement relative to the barrow body centerline;
   d. a wheel fork, including a wheel journaled therein and a flat camming surface, pivotally mounted on the table and normally spring-biased to a first position, wherein the wheel is positioned crosswise of the barrow body longitudinal centerline;
   e. a pair of legs and handles hingedly mounted at the rear end of the barrow body underface, and swingable between a first, erected, position and a second, folded, position wherein they lie flat against the underface of the barrow body;
   f. lock means mounted on the barrow body rear wall, engageable with the handles to maintain them in their first position;
   g. a first pair of tie rods connecting the tiltable table to the legs, one of the tie rods having a cam positioned at the forward end thereof, adjacent the table;
   h. a second pair of flexible tension means connecting the legs to the handles;
   i. when in their, first, erected position, the handles act through the flexible tension means and the tie rods to maintain the legs in their first, erected, position with the table tilted rearwardly, causing the tie rod cam to engage the wheel fork camming surface, to pivot the wheel fork, and its supported wheel, to a second position, wherein the wheel is in a dependent position aligned with the longitudinal centerline of the barrow body; and
   j. when the handles and legs are in their second, folded, position the tie rods act to tilt the table forward, to disengage the cam from the fork camming surface, permitting the biasing spring to pivot the fork to its first position, wherein the wheel lies against the forward wall of the barrow body, crosswise of the longitudinal centerline of the barrow body.